United States Patent
Shinoda

(10) Patent No.: US 12,388,342 B2
(45) Date of Patent: Aug. 12, 2025

(54) ELECTRONIC APPARATUS, DISPLAY DEVICE, AND VOLTAGE MANAGEMENT METHOD

(71) Applicant: Sharp NEC Display Solutions, Ltd., Tokyo (JP)

(72) Inventor: Akira Shinoda, Tokyo (JP)

(73) Assignee: Sharp NEC Display Solutions, Ltd, Tokyo (JP)

( * ) Notice: Subject to any disclaimer, the term of this patent is extended or adjusted under 35 U.S.C. 154(b) by 466 days.

(21) Appl. No.: 17/788,180

(22) PCT Filed: Dec. 27, 2019

(86) PCT No.: PCT/JP2019/051395
§ 371 (c)(1),
(2) Date: Jun. 22, 2022

(87) PCT Pub. No.: WO2021/131015
PCT Pub. Date: Jul. 1, 2021

(65) Prior Publication Data
US 2023/0017285 A1   Jan. 19, 2023

(51) Int. Cl.
*H02M 1/00*       (2007.01)
*H02M 3/157*      (2006.01)
(52) U.S. Cl.
CPC ......... *H02M 1/0006* (2021.05); *H02M 3/157* (2013.01)
(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18;
(Continued)

(56) References Cited

U.S. PATENT DOCUMENTS 7,479,767 B2 *  1/2009  Kato .................. G05F 1/56
                                         323/272
8,044,642 B2 * 10/2011  Sakai .............. H02M 3/1588
                                         323/224
(Continued)

FOREIGN PATENT DOCUMENTS

JP    S60-32566 A      2/1985
JP    2018-148676 A    9/2018
JP    2019-023042 A    2/2019

OTHER PUBLICATIONS

International Search Report (ISSR) (PCT Form PCT/ISA/210), in PCT/JP2019/051395, dated Mar. 24, 2020.

*Primary Examiner* — Jeffrey A Gblende
(74) *Attorney, Agent, or Firm* — McGinn I.P. Law Group, PLLC

(57) ABSTRACT

A reference voltage generator configured to be supplied with a first voltage from an external device and to generate a reference voltage which is a voltage lower than a second voltage which is a voltage higher than the first voltage supplied from the external device on the basis of the second voltage through negotiation with the external device; a determiner configured to determine a magnitude relationship between the second voltage and the reference voltage; and an output configured to notify that a voltage has decreased when the second voltage is equal to or lower than the reference voltage on the basis of the result of determination are included.

9 Claims, 7 Drawing Sheets

(58) Field of Classification Search
CPC ... G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | |
|---|---|---|---|
| 10,383,193 B2* | 8/2019 | Ichikawa | B60C 11/00 |
| 10,845,833 B1* | 11/2020 | Dietrich | H02M 3/157 |
| 2017/0093154 A1 | 3/2017 | Geng et al. | |
| 2018/0143916 A1 | 5/2018 | Gupta et al. | |
| 2019/0109480 A1 | 4/2019 | Hsu et al. | |

* cited by examiner

ELECTRONIC APPARATUS, DISPLAY DEVICE, AND VOLTAGE MANAGEMENT METHOD

TECHNICAL FIELD

Some of the present invention relate to an electronic apparatus, a display device, and a voltage management method.

BACKGROUND ART

In recent years, a technique in which a source device and a sink device are connected using a cable and electric power is supplied from the source device to the sink device has emerged. A cable corresponding to a standard of Universal Serial Bus (USB) Type-C can be used for connection between the source device and the sink device.

In USB Type-C, a function of supplying electric power is called USB power delivery (hereinafter referred to as USB Type-C PD).

Many batteries, AC adapters, and the like serving as source devices (a power supply side) corresponding to the standard of USB Type-C PD are on the market.

Examples of products (the power supply side) corresponding to the standard of USB Type-C PD include battery-driven devices, devices in which a VBUS power source is mounted in a source device, and AC adapters corresponding to USB PD.

A power supply device of USB PD is supplied with electric power from a source device corresponding to USB Type-C PD (such as an AC adapter, a battery, or a desktop PC) and requests necessary voltage and current through negotiation of USB Type-C, and electric power is supplied from the source device to a sink device.

In reception of electric power based on USB Type-C PD, the sink device can request 5 V, 9 V, 12 V, 15 V, and 20 V as VBUS voltages from the source device under the standard of USB Type-C PD and can conduct negotiation and be supplied with electric power as a result of the negotiation. In supply of electric power based on USB Type-C PD, the sink device can request the VBUS voltage in a range of equal to or less than a current value of 3 A when an output voltage is equal to or less than 15 V and request the VBUS voltage in a range of equal to or less than a current value of 5 A when the output voltage is 20 V.

For example, a display device is used as an example of the sink device.

When a source device and a display device are connected via a USB Type-C cable, a voltage of 5 V is supplied from the source device to the display device. A USB Type-C controller of the display device starts negotiation. When conditions of the negotiation from the display device to the source device have been satisfied, a switch between a VBUS IN line and a VBUS OUT line in the display device is turned on and electric power with a voltage of higher than 5 V is supplied to the constituents of the display device according to the result of negotiation via the VBUS OUT line. Accordingly, the sink device can operate.

At this time, since the negotiation operation is performed only once when a USB Type-C connector is inserted, outputting of the sink device (for example, displaying of a screen on the display device) is stopped when the voltage supplied from the source device such as a battery, an AC adapter, or a desktop PC decreases with long term use.

Here, since the negotiation of USB Type-C is performed only once as described above, there is a likelihood that a protection circuit (such as an overcurrent circuit) of the source device will operate in a state in which the switch between the VBUS IN line and the VBUS OUT line in the display device is turned on. In this case, the screen displayed on the display device is not displayed and the operation of the display device is stopped.

In this way, in the case in which certain failure in the source device, a decrease in battery voltage, or the like occurs, the device performing reception of electric power based on USB PD on the sink side stops its operation when it is not supplied with electric power from a device other than the source device (when it does not have a function of connection to an AC power source, or the like). Then, the screen on the display device such as the sink device is not displayed. In this case, since the screen on the display device is not displayed, there is a likelihood that a user will determine that failure has occurred in the sink device (the display device).

CITATION LIST

Patent Literature

Patent Literature 1
   Japanese Unexamined Patent Application, First Publication No. 2019-023042

SUMMARY OF INVENTION

Technical Problem

A problem to be solved is that there is a likelihood that a user will recognize that failure occurs in a sink device even when failure occurs in a source device.

Solution to Problem

One aspect of the present invention is an electronic apparatus including: a reference voltage generator configured to be supplied with a first voltage from an external device and to generate a reference voltage which is a voltage lower than a second voltage which is a voltage higher than the first voltage supplied from the external device on the basis of the second voltage through negotiation with the external device; a determiner configured to determine a magnitude relationship between the second voltage and the reference voltage; and an output configured to notify that a voltage has decreased when the second voltage is equal to or lower than the reference voltage on the basis of the result of determination.

One aspect of the present invention is a voltage management method including: being supplied with a first voltage from an external device and generating a reference voltage which is a voltage lower than a second voltage which is a voltage higher than the first voltage supplied from the external device on the basis of the second voltage through negotiation with the external device; determining a magnitude relationship between the second voltage and the reference voltage; and notifying that a voltage has decreased when the second voltage is equal to or lower than the reference voltage on the basis of the result of determination.

Advantageous Effects of Invention

According to the aspect of the present invention, a likelihood of failure occurring in a source device is notified of when a voltage supplied from the source device has decreased. Accordingly, it is possible to enable a user to understand that a device in which failure occurs is the source device.

DESCRIPTION OF EMBODIMENTS

Figure 1:
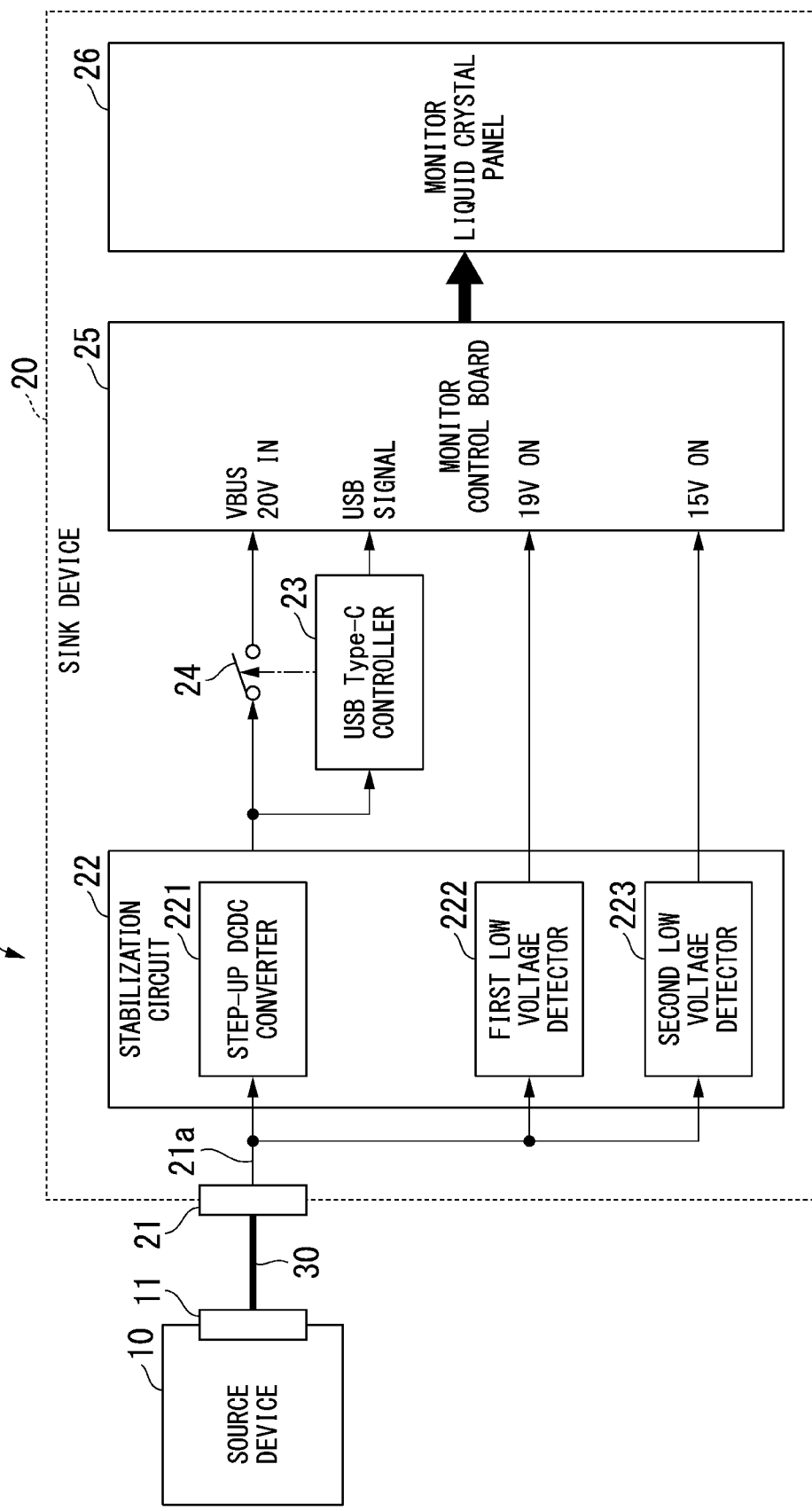
FIG. 1 is a functional block diagram illustrating a configuration of a power supply system 1 according to an aspect of the present invention.

FIG. 1 is a functional block diagram illustrating a configuration of a power supply system 1 according to an aspect of the present invention.

In the power supply system 1, a source device 10 and a sink device 20 are connected via a Universal Serial Bus (USB) Type-C cable 30.

The source device 10 conducts negotiation with the sink device 20 and supplies electric power based on a result of the negotiation to the sink device 20.

In USB Type-C, the function of supplying electric power is called USB power delivery (hereinafter referred to as USB Type-C PD). Electric power of a maximum of 100 W can be supplied and received using a USB Type-C cable.

In USB Type-C PD, an output voltage can be determined to be one voltage in a voltage range which can be supplied from the source device and in which maximum received/supplied power is 100 W on the basis of a result of negotiation between the source device and the sink device. Here, when the output voltage changes, a maximum output current may also change. For example, when supply power determined through negotiation is 60 W and the output voltage is set to a voltage in a range of 5 V to 20 V, a supply current value may be set to 3 A. When electric power in a range of 60 W to 100 W is determined as the supply power as the result of negotiation, the output current can be set to 3 A when the output voltage ranges from 5 V to 15 V, and the output current can be set to 5 A when the output voltage is set to 20 V.

The source device 10 can supply, for example, electric power of a maximum of 45 W, and can also cope with supply of electric power in a range of 45 W to 100 W. The source device 10 is a device based on the standard of USB Type-C PD. Accordingly, the source device 10 can supply electric power of equal to or higher than 45 W. In this case, the source device 10 can output an output voltage of 20 V. For example, one of a battery, an AC adapter, and a desktop PC can be used as the source device 10.

The source device 10 includes a connector 11. The connector 11 can be connected to one terminal of a USB Type-C cable 30. The other terminal of the USB Type-C cable 30 is connected to a connector 21 provided in the sink device 20. Accordingly, the source device 10 and the sink device 20 can be communicatively and electrically connected to each other via the USB Type-C cable 30, and electric power can be supplied from the source device 10 to the sink device 20.

The sink device 20 conducts negotiation with the source device 10 and requests a required output voltage from the source device 10 when electric power required by the sink device 20 is determined. The sink device 20 can request supply of electric power in a range of equal to or lower than 100 W and can request an output voltage of 20 V, for example, when negotiation has been conducted such that electric power of 100 W is supplied.

The sink device 20 includes a connector 21, a stabilization circuit 22, a USB Type-C controller 23, a switch 24, a monitor control board 25, and a monitor liquid crystal panel 26. The sink device 20 is, for example, a display device.

The connector 21 is connected to the other terminal of the USB Type-C cable 30.

The stabilization circuit 22 includes a step-up DCDC converter 221, a first low voltage detector 222, and a second low voltage detector 223.

The step-up DCDC converter 221 generates the same voltage as the voltage requested from the source device 10 through negotiation on the basis of the voltage supplied from an external device (the source device 10). More specifically, the step-up DCDC converter 221 steps up a voltage VBUS IN which is supplied via the USB Type-C cable 30. For example, the step-up DCDC converter 221 steps up the output voltage of 5 V supplied from the VBUS input line to 20 V. This output voltage 20 V is the same voltage as the voltage requested from the source device 10 through negotiation.

An input of the step-up DCDC converter 221 is connected to the VBUS input line of the USB Type-C cable 30 using the function of USB Type-C PD. The voltage supplied from the VBUS input line is, for example, an output voltage in a range of 4.75 V to 21 V according to the standard of USB Type-C PD.

An output of the step-up DCDC converter 221 is connected to the switch 24 and the USB Type-C controller 23. The voltage output from the step-up DCDC converter 221 is, for example, an output voltage in a range of 19 V to 21 V according to the standard of USB Type-C PD when the output voltage is 20 V.

In this way, the step-up DCDC converter 221 is provided between the connector 21 and the USB Type-C controller 23. Accordingly, even when the voltage VBUS IN is equal to or less than 20 V, the voltage VBUS OUT output from the step-up DCDC converter 221 can be supplied as a fixed voltage of 20 V by causing the step-up DCDC converter 221 to step up the voltage. As a result, since the VBUS supply voltage can be stably supplied at 20 V, it is possible to prevent an erroneous operation in controlling a power-supplied device of USB Type-C PD (the sink device 20).

The first low voltage detector 222 is connected to the VBUS input line between the connector 21 and an input terminal of the step-up DCDC converter 221 and determines a magnitude relationship between the voltage of a BUS input line and a first voltage reference value. Since a minimum reference voltage when the output voltage is 20 V is defined as 19 V in the standard of USB Type-C PD, the minimum reference voltage can be used as the first voltage reference value. That is, the first voltage reference value is, for example, 19 V.

The first voltage reference value may be generated using a first reference voltage generating function of generating a first reference voltage lower than the voltage determined through negotiation. For example, as in an embodiment which will be described later, the first reference voltage generating function may be realized by a DCDC converter that generates the first reference voltage using the voltage of the VBUS input line input to the step-up DCDC converter 221 as an input and supplies the generated first reference voltage to the first low voltage detector 222.

For example, as in an embodiment which will be described later, the first reference voltage generating function may generate the first reference voltage through resistive voltage division using resistors using the voltage of the VBUS input line input to the step-up DCDC converter 221 as an input and supply the generated first reference voltage to the first low voltage detector 222.

The first low voltage detector 222 determines whether the voltage VBUS IN supplied from the VBUS input line is equal to or less than 19 V and outputs a signal indicating that the voltage VBUS IN is equal to or less than 19 V to the monitor control board 25 when the voltage VBUS IN is equal to or less than 19 V. By causing the first low voltage detector 222 to output the signal based on the result of determination, the monitor control board 25 can cause the monitor liquid crystal panel 26 to display that a residual capacity of a battery in the source device has decreased or that the source device has deteriorated.

For example, the monitor control board 25 may display that a residual capacity of a battery has decreased when the source device is a device that supplies electric power using the battery and display that an abnormality has occurred in a voltage output from the source device when the source device is an AC adapter or a desktop PC.

Accordingly, it is possible to display an alarm indicating that there is a likelihood that an abnormality has not occurred in the function of the sink device 20 but an abnormality has occurred in the source device 10 through microcomputer control or the like.

The second low voltage detector 223 is connected to the VBUS input line between the connector 21 and the input terminal of the step-up DCDC converter 221 and determines a magnitude relationship between the voltage of the BUS input line and a second voltage reference value. The second voltage reference value is, for example, 15 V.

The second voltage reference value may be generated using a second reference voltage generating function of generating a second reference voltage lower than the first reference voltage. For example, as in an embodiment which will be described later, the second reference voltage generating function may be realized by a DCDC converter that generates the second reference voltage using the voltage of the VBUS input line input to the step-up DCDC converter 221 as an input and supplies the generated second reference voltage to the second low voltage detector 223.

For example, as in an embodiment which will be described later, the second reference voltage generating function may generate the second reference voltage through resistive voltage division using resistors using the voltage of the VBUS input line input to the step-up DCDC converter 221 as an input and supply the generated second reference voltage to the second low voltage detector 223.

The second low voltage detector 223 determines whether the voltage VBUS IN supplied from the VBUS input line is equal to or less than 15 V and outputs a signal indicating that the voltage VBUS IN is equal to or less than 15 V to the monitor control board 25 when the voltage VBUS IN is equal to or less than 15 V. By causing the second low voltage detector 223 to output the signal based on the result of determination, the monitor control board 25 can cause the monitor liquid crystal panel 26 to display that the residual capacity of the battery in the source device has decreased or that the source device has deteriorated.

The monitor control board 25 may cause the monitor liquid crystal panel 26 to display a message of battery exhaustion or the like as on-screen display (OSD) for a predetermined time (for example, 1 minute) and cut off supply of electric power to the monitor liquid crystal panel 26 or stop the operation of the sink device 20 through a power supply management function after the predetermined time has elapsed.

In this way, since the first low voltage detector 222 and the second low voltage detector 223 are provided and various types of information are output when the voltage supplied from the source device 10 is equal to or less than a predetermined voltage, a user can understand that an abnormality has not occurred in the sink device 20 but an abnormality has occurred in the source device 10 by ascertaining details of the output information.

When the source device 10 is connected via the connector 21, the USB Type-C controller 23 detects that the source device 10 is connected via the connector 21, conducts negotiation with the source device 10, and requests electric power or a voltage in a range of electric power with which the source device 10 and the sink device 20 can cope.

The USB Type-C controller 23 receives an input of a voltage output from the step-up DCDC converter 221 and acquires a VBUS signal superimposed on the voltage by performing filtering or the like thereon. The USB Type-C controller 23 can conduct negotiation with reference to the VBUS signal.

When negotiation has been established (ended), the USB Type-C controller 23 supplies the voltage output from the step-up DCDC converter 221 to the monitor control board 25 by turning on the switch 24.

The USB Type-C controller 23 can monitor the voltage supplied from the step-up DCDC converter 221 and stop supply of the voltage to the monitor control board 25 by turning off the switch 24 when it is determined as a result of monitoring that an abnormality has occurred in the supplied voltage.

Here, since the USB Type-C controller 23 monitors the voltage and a fixed voltage is output from the step-up DCDC converter 221, it is possible to curb cases in which it is determined that the voltage is equal to or less than a predetermined voltage. Accordingly, even when a certain amount of fluctuation occurs in the voltage supplied from the source device 10, a fixed voltage can be continuously supplied to the monitor control board 25 and thus it is possible to prevent the USB Type-C controller 23 from turning off the switch 24 by detecting that the voltage is a low voltage.

The switch 24 switches between an on state and an off state on the basis of a signal output from the USB Type-C controller 23. The voltage output from the step-up DCDC converter 221 is supplied to the monitor control board 25 when the switch 24 switches to the on state, and the voltage output from the step-up DCDC converter 221 is not supplied to the monitor control board 25 when the switch 24 switches to the off state.

The monitor control board 25 detects whether negotiation has been established on the basis of a USB signal USB SIGNAL output from the USB Type-C controller 23. The USB signal USB SIGNAL can be used as a signal indicating a result of determination of whether negotiation has been established.

The monitor control board 25 displays various types of information on the monitor liquid crystal panel 26 according to the signal output from the first low voltage detector 222 or the second low voltage detector 223. Accordingly, when the voltage output from the source device 10 has decreased, it is possible to notify the sink device 20 that an abnormality has occurred in the source device 10 by outputting an alarm from the sink device. When a signal output from the second low voltage detector 223 is acquired and the source device is a device using a battery or the like, the monitor control board 25 displays an alarm for notifying of battery exhaustion or the like. The monitor control board 25 can notify of an alarm indicating battery exhaustion or the like, for example, in a plurality of steps. The plurality of steps may be three steps.

The monitor liquid crystal panel 26 is a liquid crystal display panel and displays various types of information according to a signal from the monitor control board 25.

In this embodiment, an example in which the stabilization circuit 22 of the sink device 20 includes the step-up DCDC converter 221, the first low voltage detector 222, and the second low voltage detector 223 has been described above, but a configuration in which the stabilization circuit 22 includes the step-up DCDC converter 221 but does not include the first low voltage detector 222 and the second low voltage detector 223 may be employed. That is, the stabilization circuit 22 does not monitor a low voltage using the first low voltage detector 222 and the second low voltage detector 223, but since the step-up DCDC converter 221 is provided, the stabilization circuit 22 can supply the voltage VBUS OUT output from the step-up DCDC converter 221 to be a fixed voltage of 20 V by causing the step-up DCDC converter 221 to step up the voltage even when the voltage VBUS IN supplied from the source device 10 becomes equal to or less than 20 V after negotiation for requesting the voltage of 20 V has been established. Accordingly, since the monitor control board 25 can be supplied with a voltage of less fluctuation, it is possible to continuously operate the sink device 20.

A power supply system 1A according to a second embodiment will be described below.

Figure 2:
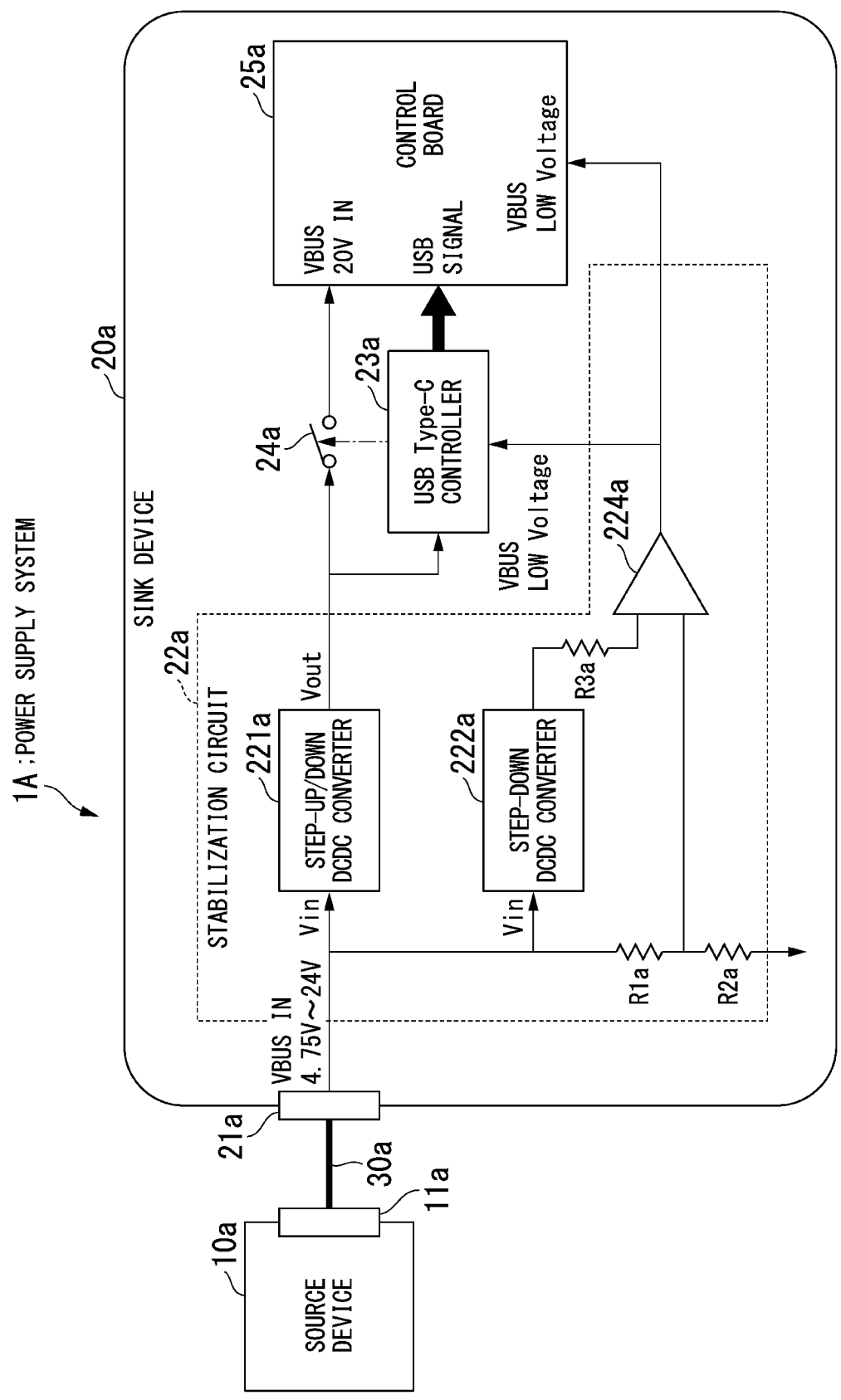
FIG. 2 is a block diagram schematically illustrating a configuration of a power supply system 1A according to a second embodiment of the present invention.

FIG. 2 is a block diagram schematically illustrating a configuration of the power supply system 1A according to the second embodiment. In the power supply system 1A, a source device 10a and a sink device 20a are connected via a USB Type-C cable 30a. The power supply system 1A shares some functions with the power supply system 1 illustrated in FIG. 1.

The source device 10a has functions shared with the source device 10, but is different therefrom in a function of outputting an output voltage in a range of rated output of 21 V to 24 V. For example, a device such as a battery, an AC adapter, or a desktop PC can be used as the source device 10a.

The sink device 20a shares some functions of the sink device 20 and thus differences will be mainly described. The sink device 20a requests an output voltage of 20 V after negotiation.

The sink device 20a includes a connector 21a, a stabilization circuit 22a, a USB Type-C controller 23a, a switch 24a, and a control board 25a.

The stabilization circuit 22a includes a step-up/down DCDC converter 221a, a step-down DCDC converter 222a, a comparator 224a, a resistor R1a, a resistor R2a, and a resistor R3a.

The step-up/down DCDC converter 221a shares some functions of the step-up DCDC converter 221 and thus different functions will be described.

An input of the step-up/down DCDC converter 221a is connected to a VBUS input line of a USB Type-C cable 30a using a function of USB Type-C PD. An output of the step-up/down DCDC converter 221a is connected to the switch 24a and the USB Type-C controller 23a.

The step-up/down DCDC converter 221a has a function of converting a voltage supplied from the source device 10a, an input voltage Vin supplied from the VBUS input line ranges from 4.75 V to 30 V, and the step-up/down DCDC converter 221a can convert the output voltage Vout to 5 V or 20 V and output the converted voltage.

In this way, the step-up DCDC converter 221 is provided between the connector 21a and the USB Type-C controller 23a. Accordingly, by causing the step-up/down DCDC converter 221a to step up or down a voltage even when an output voltage in a range of 21 V to 24 V is supplied from the source device 10a, it is possible to curb fluctuation of a voltage such that the voltage VBUS OUT output from the step-up/down DCDC converter 221a is one voltage of 5 V and 20 V and to supply the voltage. As a result, since the VBUS supply voltage can be stably supplied at 5 V or 20 V, it is possible to prevent an erroneous operation in controlling a power-supplied device (the sink device 20a) of USB Type-C PD.

The step-down DCDC converter 222a has a function of converting a voltage supplied from an external device (the source device 10a), an input voltage Vin supplied from the VBUS input line ranges from 4.75 V to 30 V, and the step-down DCDC converter 222a can convert the input voltage Vin to an output voltage Vout (for example, 5 V) by stepping down the input voltage Vin and output the converted voltage. The step-down DCDC converter 222a may convert the input voltage Vin to the output voltage Vout of 5 V by stepping up the input voltage and output the converted voltage when the input voltage Vin is lower than 5 V.

The input of the step-down DCDC converter 222a is connected to the VBUS input line between the connector 21a and the input terminal of the step-up/down DCDC converter 221a. The output of the step-down DCDC converter 222a is connected to one terminal of the resistor R3a. Here, since the resistor R3a is connected to the comparator 224a, the step-down DCDC converter 222a has a function of supplying a reference power for monitoring the voltage supplied from the source device 10a to the comparator 224a via the resistor R3a.

One terminal of the resistor R1a is connected to the VBUS input line between the connector 21a and the input terminal of the step-up/down DCDC converter 221a. The other terminal of the resistor R1a is connected to one terminal of the resistor R2a.

One terminal of the resistor R2a is connected to the other terminal of the resistor R1a. The other terminal of the resistor R2a is connected to the ground.

One terminal of the resistor R3a is connected to the output of the step-down DCDC converter 222a. The other terminal of the resistor R3a is connected to a first terminal of the comparator 224a.

The first terminal of the comparator 224a is connected to the other terminal of the resistor R3a. A second terminal of the comparator 224a is connected to a connection point between the resistor R1a and the resistor R2a.

Here, since the resistor R1a and the resistor R2a are connected in series and one terminal of the resistor R1a is connected to the VBUS input line, the resistors serve as a resistor that detects the voltage VBUS IN. Since the second terminal of the comparator 224a is connected to the connection point between the resistor R1a and the resistor R2a, a voltage based on a division ratio of the resistor R1a and the resistor R2a is input to the comparator 224a via the second terminal. Here, resistance values of the resistor R1a and the resistor R2a are set such that a voltage between the resistor R1a and the resistor R2a is 5 V when a voltage of 18.5 V is input from the VBUS input line. In this way, the voltage based on the resistive voltage division using the resistor R1a and the resistor R2a is input to the second terminal of the comparator 224a.

The comparator 224a compares a voltage input to the second terminal with the output voltage (5 V) of the step-down DCDC converter 222a input to the first terminal of the comparator 224a via the resistor R3a.

When the voltage input via the second terminal is equal to or less than 5 V (the voltage of the VBUS input line is 18.5 V) on the basis of the result of comparison, the comparator 224a sets the comparator output to ON and outputs a VBUS Low Voltage signal to the USB Type-C controller 23a and the monitor control board 25a. The comparator 224a can notify that the output voltage of the source device 10a has decreased by outputting the VBUS Low Voltage signal.

The USB Type-C controller 23a shares some functions with the USB Type-C controller 23.

When the source device 10a is connected via the connector 21a, the USB Type-C controller 23a detects that the source device 10a is connected via the connector 21a, conducts negotiation with the source device 10a, and requests electric power or a voltage in a range of electric power with which the source device 10a and the sink device 20a can cope.

The USB Type-C controller 23a receives the voltage output from the step-up/down DCDC converter 221a and acquires a VBUS signal superimposed on the voltage by performing filtering or the like. The USB Type-C controller 23a can conduct negotiation with reference to the VBUS signal.

When negotiation has been established (ended), the USB Type-C controller 23a supplies the voltage output from the step-up/down DCDC converter 221a to the monitor control board 25a by turning on the switch 24a.

The USB Type-C controller 23a monitors the voltage supplied from the step-up/down DCDC converter 221a and stops supply of a voltage to the monitor control board 25a by turning off the switch 24a when an abnormality has occurred in the supplied voltage.

Here, the USB Type-C controller 23a monitors the voltage output from the step-up/down DCDC converter 221a, but a fixed voltage (20 V) is output from the step-up/down DCDC converter 221a and thus it is possible to decrease the number of times it is determined that the output voltage is equal to or less than a predetermined voltage on the basis of the result of monitoring. Accordingly, even when the voltage supplied from the source device 10a fluctuates more or less, a fixed voltage can be continuously supplied to the monitor control board 25a and thus it is possible to decrease the number of times the USB Type-C controller 23a detects a low voltage and turns off the switch 24.

The switch 24a switches between an on state and an off state on the basis of a signal output from the USB Type-C controller 23a. The voltage output from the step-up/down DCDC converter 221a is supplied to the control board 25a when the switch 24a switches to the on state, and the voltage output from the step-up/down DCDC converter 221a is not supplied to the control board 25a when the switch 24a switches to the off state.

The control board 25a receives the voltage supplied from the step-up/down DCDC converter 221a via the switch 24a and performs its operation. When the VBUS Low Voltage signal output from the comparator 224a is acquired, the control board 25a detects that the voltage output from the source device 10a has decreased to equal to or less than a predetermined voltage (18.5 V). Accordingly, necessary control can be performed. For example, when it is detected that the voltage has decreased to equal to or less than the predetermined voltage, the control board 25a outputs an alarm signal to a device in a subsequent stage.

The control board 25a receives the SUB SIGNL output from the USB Type-C controller 23a.

Figure 3:
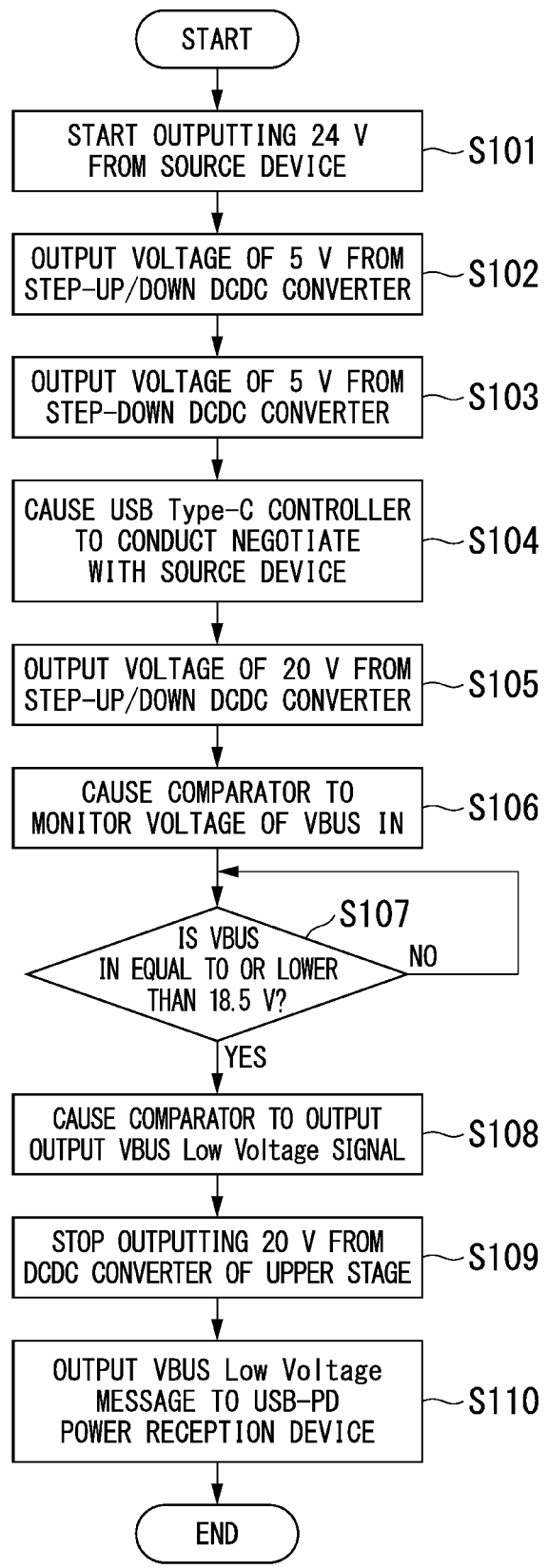
FIG. 3 is a flowchart illustrating operations of a sink device 20a in the power supply system 1A.

The operation of the sink device 20a in the power supply system 1A will be described below with reference to the flowchart illustrated in FIG. 3.

When the source device 10a is powered on and a voltage of 24 V is output from the source device 10a (Step S101), the step-up/down DCDC converter 221a converts the voltage supplied from the source device 10a to 5 V and outputs the converted voltage to the USB Type-C controller 23a (Step S102). On the other hand, the step-down DCDC converter 222a converts the voltage supplied from the source device 10a to 5 V and outputs the converted voltage to the first terminal of the comparator 224a via the resistor R3a (Step S103).

When the voltage of 5 V is supplied from the step-up/down DCDC converter 221a, the USB Type-C controller 23a conducts negotiation with the source device 10a (Step S104). The USB Type-C controller 23a requests supply of a voltage of 20 V by conducting negotiation with the source device 10a. Then, the source device 10a receives the request and supplies the voltage of 20 V to the sink device 20a.

When the negotiation has been ended, the step-up/down DCDC converter 221a converts the voltage supplied from the source device 10a to 20 V and outputs the converted voltage to the USB Type-C controller 23a (Step S105). The USB Type-C controller 23a turns on the switch 24a when the voltage of 20 V is supplied. Accordingly, the voltage of 20 V is supplied to the control board 25a. The control board 25a controls the constituents of the sink device 20a.

On the other hand, the comparator 224a starts monitoring the voltage supplied from the VBUS input line (Step S106). The comparator 224a compares the voltage of 5 V output from the step-down DCDC converter 222a with a voltage obtained by dividing the voltage supplied from the VBUS input line (the voltage of VBUS IN) using the resistor R1a and the resistor R2a and determines whether the voltage of VBUS IN is equal to or less than a reference voltage (18.5 V) (Step S107).

When the voltage of VBUS IN is greater than the reference voltage (18.5 V) (Step S107: NO), the comparator 224a continues to determine whether the voltage of VBUS IN is equal to or less than the reference voltage (18.5 V).

When the voltage of VBUS IN is equal to or less than the reference voltage (18.5 V) (Step S107: YES), the comparator 224a turns on the output of the comparator and outputs the VBUS Low Voltage signal to the USB Type-C controller 23a and the control board 25a (Step S108).

When the VBUS Low Voltage signal is input from the comparator 224a, the USB Type-C controller 23a stops outputting the voltage of 20 V from the step-up/down DCDC converter 221a by stopping conversion of electric power in the step-up/down DCDC converter 221a (Step S109).

The control board 25a outputs a VBUS Low Voltage message to a device in a stage (for example, a display device) subsequent to the control board 25a in the sink device 20a (Step S110). Accordingly, it is possible to display the VBUS Low Voltage message.

A third embodiment will be described below.

Figure 4:
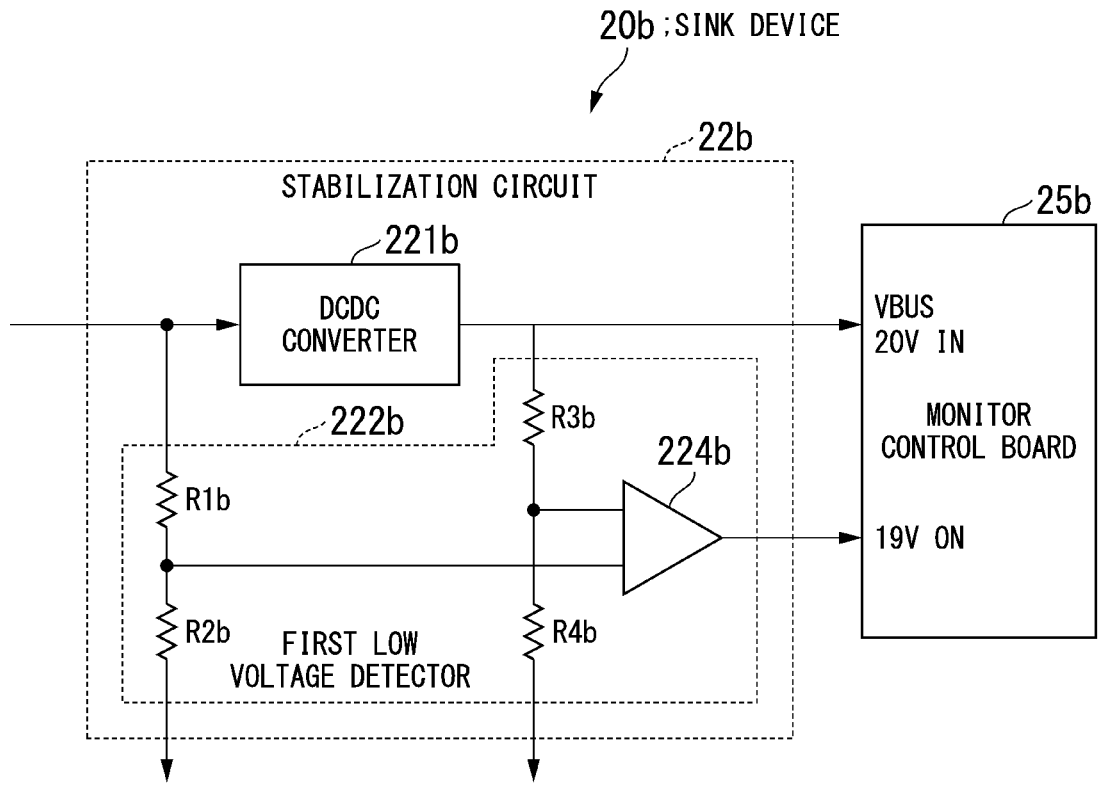
FIG. 4 is a block diagram schematically illustrating a configuration of a sink device 20b according to a third embodiment.

FIG. 4 is a block diagram schematically illustrating a configuration of a sink device 20b according to the third embodiment.

Similarly to the sink device according to the first or second embodiment, the sink device 20b is electrically connected to a source device via a USB Type-C cable and can be supplied with electric power from the source device by conducting negotiation with the source device.

The sink device 20b includes a stabilization circuit 22b and a monitor control board 25b.

The stabilization circuit 22b includes a DCDC converter 221b and a first low voltage detector 222b.

The DCDC converter 221b steps up or down a voltage VBUS IN supplied from the source device via the USB Type-C cable. For example, the voltage supplied from the source device to the DCDC converter 221b via the VBUS input line is an output voltage in a range of 4.75 V to 21 V based on the USB Type-C PD standard.

The output of the DCDC converter 221b is connected to the monitor control board 25b and one terminal of the resistor R3a. The voltage output from the DCDC converter 221b is, for example, an output voltage in a range of 19 V to 21 V based on the USB Type-C PD standard.

The DCDC converter 221b converts the output voltage in the range of 4.75 V to 21 V supplied from the source device to an output voltage in the range of 19 V to 21 V and outputs the converted voltage to a subsequent stage (for example, the monitor control board 25b).

In this way, the DCDC converter 221b can supply a fixed voltage of 20 V as the voltage VBUS OUT output from the DCDC converter 221b by converting the voltage even when the voltage VBUS IN is equal to or less than 20 V. Accordingly, since 20 V can be stably supplied as the voltage VBUS, it is possible to prevent an erroneous control operation of a device supplied with electric power (the sink device 20b) based on the USB Type-C PD standard.

The first low voltage detector 222b determines whether the voltage supplied from the source device is equal to or less than a first voltage reference value and outputs the result of determination to the monitor control board 25b. The first voltage reference value is, for example, 20 V.

The first low voltage detector 222b includes a resistor Rib, a resistor R2b, a resistor R3b, a resistor R4b, and a comparator 224b.

One terminal of the resistor R1b is connected to the VBUS input line. The other terminal of the resistor R1b is connected to one terminal of the resistor R2b.

One terminal of the resistor R2b is connected to the other terminal of the resistor R1b. The other terminal of the resistor R2b is connected to the ground.

One terminal of the resistor R3b is connected to an output of the DCDC converter 221b. The other terminal of the resistor R3b is connected to one terminal of the resistor R4b.

One terminal of the resistor R4b is connected to the other terminal of the resistor R3b. The other terminal of the resistor R4b is connected to the ground.

A first terminal of the comparator 224b is connected to a connection point between the resistor R3b and the resistor R4b. A second terminal of the comparator 224b is connected to a connection point between the resistor R1a and the resistor R2a.

Here, since the resistor R3b and the resistor R4b are connected in series and the first terminal of the comparator 224b is connected to the connection point between the resistor R3b and the resistor R4b, a voltage based on a voltage division ratio of the resistor R3b and the resistor R4b is input as a reference voltage from the first terminal. Here, the output voltage of the DCDC converter 221b is used as the reference voltage for the DCDC converter 221b to stably output the output voltage 20 V.

Resistance values of the resistor R3b and the resistor R4b are set such that a voltage between the resistor R3b and the resistor R4b is 5 V when a voltage of 20 V is input from the output of the DCDC converter 221b. In this way, the voltage based on the resistive voltage division using the resistor R3b and the resistor R4b is input to the first terminal of the comparator 224b.

Resistance values of the resistor R1b and the resistor R2b are set such that a voltage between the resistor R1b and the resistor R2b is 5 V when a voltage of 19 V is input from the VBUS input line. In this way, the voltage based on the resistive voltage division using the resistor R1b and the resistor R2b is input to the second terminal of the comparator 224b.

The comparator 224b uses the voltage (5 V) input to the first terminal of the comparator 224b as the reference voltage and compares the voltage input to the second terminal of the comparator 224b with the reference voltage.

The comparator 224b turns on the output of the comparator and outputs a 19 V ON signal to the monitor control board 25b when the voltage input via the second terminal is equal to or less than 5 V (the VBUS input line 19 V) on the basis of the result of comparison between the voltage input to the first terminal and the voltage input to the second terminal. The comparator 224b can notify the monitor control board 25b that the output voltage of the source device has decreased by outputting the 19 V ON signal. When the 19 V ON signal is input, the monitor control board 25b outputs alarm information indicating that the output voltage of the source device has decreased using an output device.

The alarm information can be output by the monitor control board 25b using any method of notifying a user of the sink device 20b of the alarm information. For example, the method of notification may employ a lamp provided in the sink device 20b or may employ a liquid crystal panel when the liquid crystal panel is provided in the sink device 20b.

Figure 5:
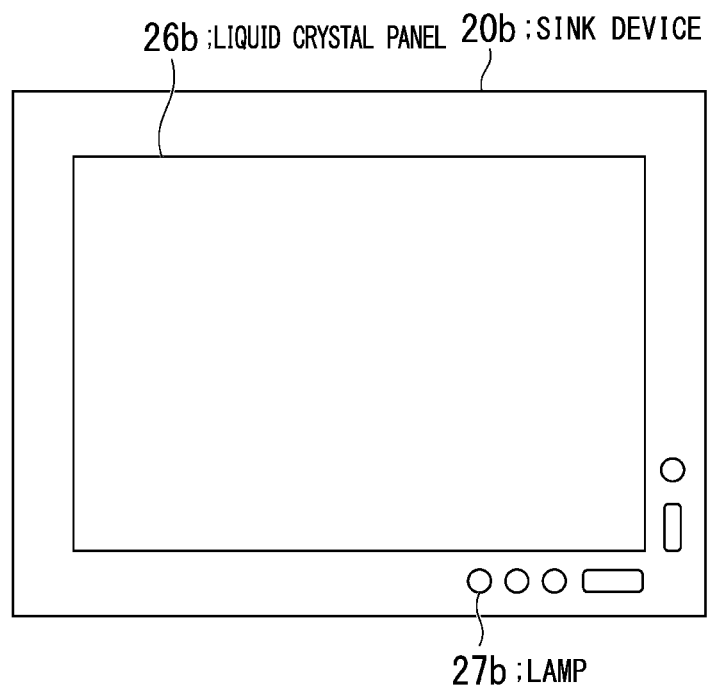
FIG. 5 is a diagram illustrating a front appearance of the sink device when the sink device 20b is a display device.

FIG. 5 is a diagram illustrating a front appearance of a sink device when the sink device 20b is a display device. The sink device 20b is, for example, a display device that operates by being supplied with electric power based on the USB Type-C PD standard and does not have a function of being supplied with electric power from an external device (an AC power supply) other than the source device.

A plurality of lamps or switches are provided on a front surface of the sink device 20b. For example, one lamp 27b of the plurality of lamps serves as a power supply lamp. A power supply lamp which is provided in a general display device can be used as the lamp 27b. The control board 25b may use the power supply lamp as the lamp 27b or may use another lamp. The lamp 27b may be a light emitting diode (LED).

When it is connected to a source device via a USB Type-C cable, the sink device 20b transitions to a power save mode and the sink device 20b conducts negotiation. When negotiation has been established, the sink device 20b turns on the power supply.

Here, when it is detected that a source device has been connected via the USB Type-C cable, the control board 25b turns on the lamp 27b in a first color (for example, red). Accordingly, it is possible to display a standby mode. Then, negotiation is performed, and the control board 25b turns on the lamp 27b in a second color (for example, blue) which is a color different from the first color when the negotiation has been established. The control board 25b operates a liquid crystal panel 26b to display an image signal. On the other hand, when negotiation has not been established or when a 19 V ON signal is input from the stabilization circuit 22b (the comparator 224b), the control board 25b detects that the voltage output from the source device is less than the first reference voltage (for example, 19 V) and causes the lamp 27b to flicker in the first color.

In this way, it is possible to notify that the voltage supplied from the source device is less than the first reference voltage using a lamp provided in the sink device 20b. Accordingly, a user can understand that an abnormality has occurred in the sourced device instead of the sink device by ascertaining the lighting state of the lamp 27b even when the voltage supplied from the source device decreases and the image signal is not displayed on the liquid crystal panel 26b.

Figure 6:
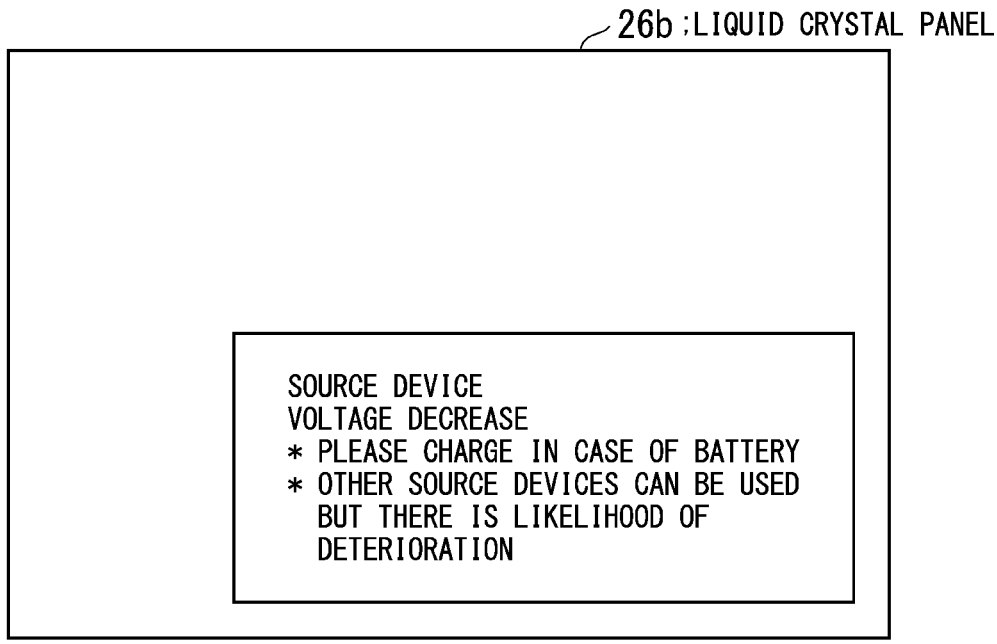
FIG. 6 is a diagram illustrating an example in which alarm information is output using a liquid crystal panel 26b of the sink device 20b.

FIG. 6 is a diagram illustrating an example in which alarm information is output using the liquid crystal panel 26b of the sink device 20b. When a 19 V ON signal is input from the stabilization circuit 22b (the comparators 224b) and it is detected that the voltage output from the source device is less than the first reference voltage (for example, 19 V), the sink device 20b may display alarm information on the liquid crystal panel 26b instead of causing the lamp 27b to flicker in the first color. In this case, when the 19 V ON signal is input, the control board 25b displays alarm information as a message on an on-screen display (OSD). This message includes, for example, a message indicating that the output voltage of the source device has decreased, a message indicting that charging of the source device is prompted or a message indicting that a residual capacity of a battery of the source device has decreased when the source device is a battery-driven device, or a message indicating that the source device has deteriorated. Accordingly, a user can ascertain whether the source device is being charged or an abnormality has occurred in the source device. Here, since alarm information is displayed on the OSD, it is also possible to continuously display an image signal.

A fourth embodiment will be described below.

Figure 7:
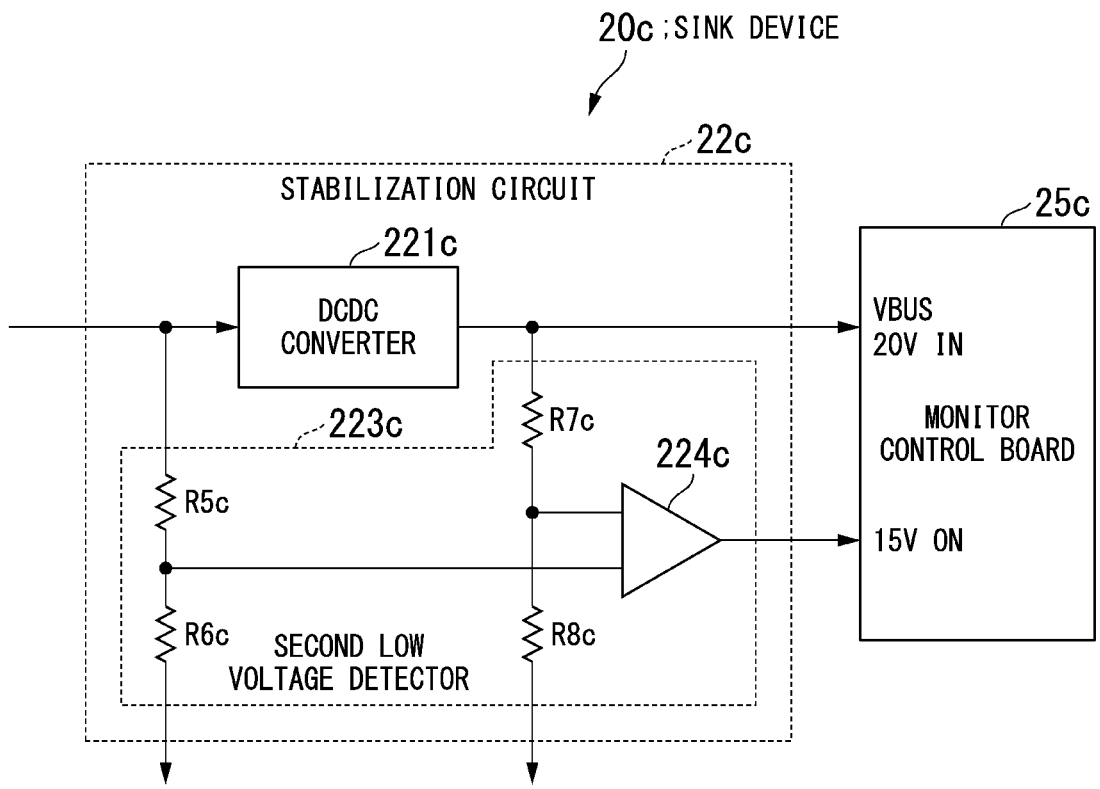
FIG. 7 is a block diagram schematically illustrating a configuration of a sink device 20c according to a fourth embodiment.

FIG. 7 is a block diagram schematically illustrating a configuration of a sink device 20c according to the fourth embodiment.

The sink device 20c has the functions shared by the sink device 20b according to the third embodiment and is different therefrom in that the reference voltage used for determination is a second reference voltage and in an operation after the 19 V ON signal has been input. Differences will be mainly described below.

Similarly to the sink device according to the first or second embodiment, the sink device 20c is electrically connected to the source device via the USB Type-C cable and can be supplied with electric power from the source device by conduct negotiation.

The sink device 20c includes a stabilization circuit 22c and a monitor control board 25c.

The stabilization circuit 22c includes a DCDC converter 221c and a second low voltage detector 223c.

The DCDC converter 221c steps up or down a voltage VUS IN (for example, any output voltage in the range of 4.75 V to 21 V) supplied from the source device via the USB Type-C cable.

The output of the DCDC converter 221c is connected to a monitor control board 25c and one terminal of a resistor R7a. The voltage output from the DCDC converter 221c is, for example, any output voltage in the range of 19 V to 21 V based on the USB Type-C PD standard.

The DCDC converter 221c converts the output voltage in the range of 4.75 V to 21 V supplied from the source device to one output voltage in the range of 19 V to 21 V and outputs the converted voltage to a subsequent stage (for example, the monitor control board 25c).

In this way, the DCDC converter 221c can supply a fixed voltage of 20 V as the voltage VBUS OUT output from the DCDC converter 221c by converting the voltage even when the voltage VBUS IN is equal to or less than 20 V. Accordingly, since the VBUS supply voltage can be stably supplied at 20 V, it is possible to prevent an erroneous operation in controlling a power-supplied device (the sink device 20b) of USB Type-C PD.

The second low voltage detector 223c determines whether the voltage supplied from the source device is equal to or less than a second voltage reference voltage and outputs the result of determination to the monitor control board 25c. The second voltage reference value is, for example, 15 V.

The second low voltage detector 223c includes a resistor R5c, a resistor R6c, a resistor R7c, a resistor R8c, and a comparator 224c.

One terminal of the resistor R5c is connected to the VBUS input line. The other terminal of the resistor R5c is connected to one terminal of the resistor R6c.

One terminal of the resistor R6c is connected to the other terminal of the resistor R5c. The other terminal of the resistor R6c is connected to the ground.

One terminal of the resistor R7c is connected to the output of the DCDC converter 221c. The other terminal of the resistor R7c is connected to one terminal of the resistor R8c.

One terminal of the resistor R8c is connected to the other terminal of the resistor R7c. The other terminal of the resistor R8c is connected to the ground.

A first terminal of the comparator 224c is connected to a connection point between the resistor R7c and the resistor R8c. A second terminal of the comparator 224c is connected to a connection point between the resistor R5c and the resistor R6c.

Here, since the resistor R7c and the resistor R8c are connected in series and the first terminal of the comparator 224c is connected to the connection point between the resistor R7c and the resistor R8c, a voltage based on a voltage division ratio of the resistor R7c and the resistor R8c is input as a reference voltage from the first terminal. Here, the output voltage of the DCDC converter 221c is used as the reference voltage for the DCDC converter 221b to stably output the output voltage 20 V.

Resistance values of the resistor R7c and the resistor R8c are set such that a voltage between the resistor R7c and the resistor R8c is 5 V when a voltage of 20 V is input from the output of the DCDC converter 221c. In this way, the voltage based on the resistive voltage division using the resistor R7c and the resistor R8c is input to the first terminal of the comparator 224c.

Resistance values of the resistor R5c and the resistor R6c are set such that a voltage between the resistor R5c and the resistor R6c is 5 V when a voltage of 15 V is input from the VBUS input line. In this way, the voltage based on the resistive voltage division using the resistor R5c and the resistor R6c is input to the second terminal of the comparator 224c.

The comparator 224c uses the voltage (5 V) input to the first terminal of the comparator 224c as the reference voltage and compares the voltage input to the second terminal of the comparator 224c with the reference voltage.

The comparator 224c turns on the output of the comparator and outputs a 15 V ON signal to the monitor control board 25c when the voltage input via the second terminal is equal to or less than 5 V (the VBUS input line 15 V) on the basis of the result of comparison between the voltage input to the first terminal and the voltage input to the second terminal. The comparator 224c can notify the monitor control board 25c that the output voltage of the source device has decreased by outputting the 15 V ON signal. When the 15 V ON signal is input, the monitor control board 25c outputs alarm information indicating that the output voltage of the source device has decreased using an output device.

The alarm information can be output by the monitor control board 25c using any method of notifying a user of the sink device 20c of the alarm information. For example, the method of notification may employ a lamp provided in the sink device 20c or may employ a liquid crystal panel when the liquid crystal panel is provided in the sink device 20c.

Figure 8:
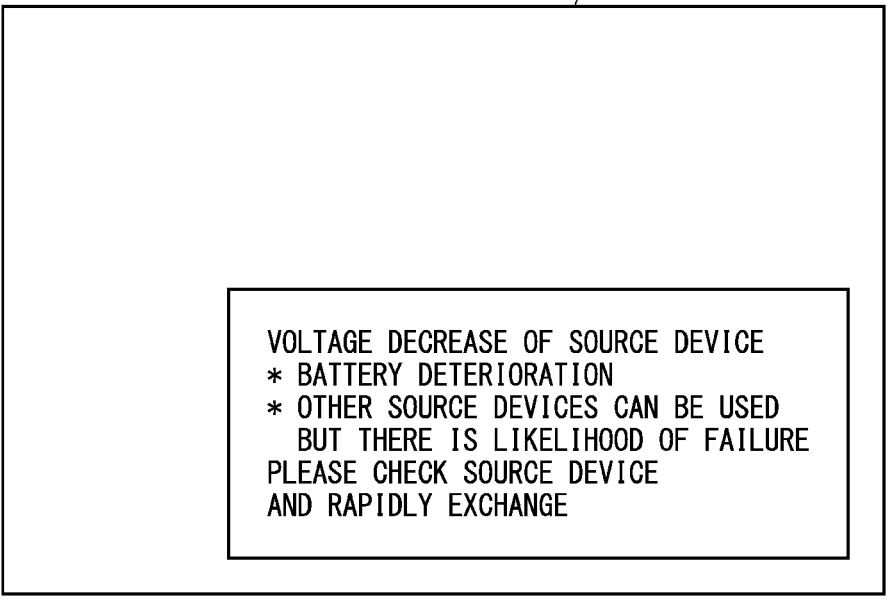
FIG. 8 is a diagram illustrating an example in which alarm information is output using a liquid crystal panel 26c provided in the sink device 20c.

FIG. 8 is a diagram illustrating an example in which alarm information is output using the liquid crystal panel 26c of the sink device 20c. When a 15 V ON signal is input from the stabilization circuit 22c (the comparators 224c), the sink device 20c detects that the voltage output from the source device is less than the second reference voltage (for example, 15 V) and displays alarm information on the liquid crystal panel 26c. In this case, when the 15 V ON signal is input, the control board 25c displays alarm information as a message on an OSD. This message may include, for example, a message indicating that the output voltage of the source device has decreased and a message indicting that a battery has deteriorated or a message indicating that the source device has deteriorated when the source device is a battery-driven device.

When the 15 V ON signal is output from the comparator 224c, there is a likelihood of deterioration, failure, or the like of the source device and there is also a likelihood that an erroneous operation has been performed or an image signal displayed on the liquid crystal panel has not been displayed because electric power supplied to the liquid crystal panel has also decreased. Therefore, the monitor control board 25c displays a message based on the OSD for a predetermined time (for example, 1 minute) and then stops supply of electric power to the liquid crystal panel. In this way, by notifying that an image signal is not displayed using a message or the like in advance, a user can understand that there is a likelihood that an abnormality has not occurred in the sink device 20c but an abnormality has occurred in the source device.

In the fourth embodiment, since the DCDC converter 221c is provided, it is possible to stably supply electric power of 20 V to the liquid crystal panel. Accordingly, for example, even when a display device with power specifications in which necessary electric power is defined as 45 W or greater is applied as the sink device 20c, it is possible to prevent an image signal displayed on a screen from disappearing suddenly or to prevent the sink device from operating erroneously.

A sink device 20d according to a fifth embodiment will be described below.

Figure 9:
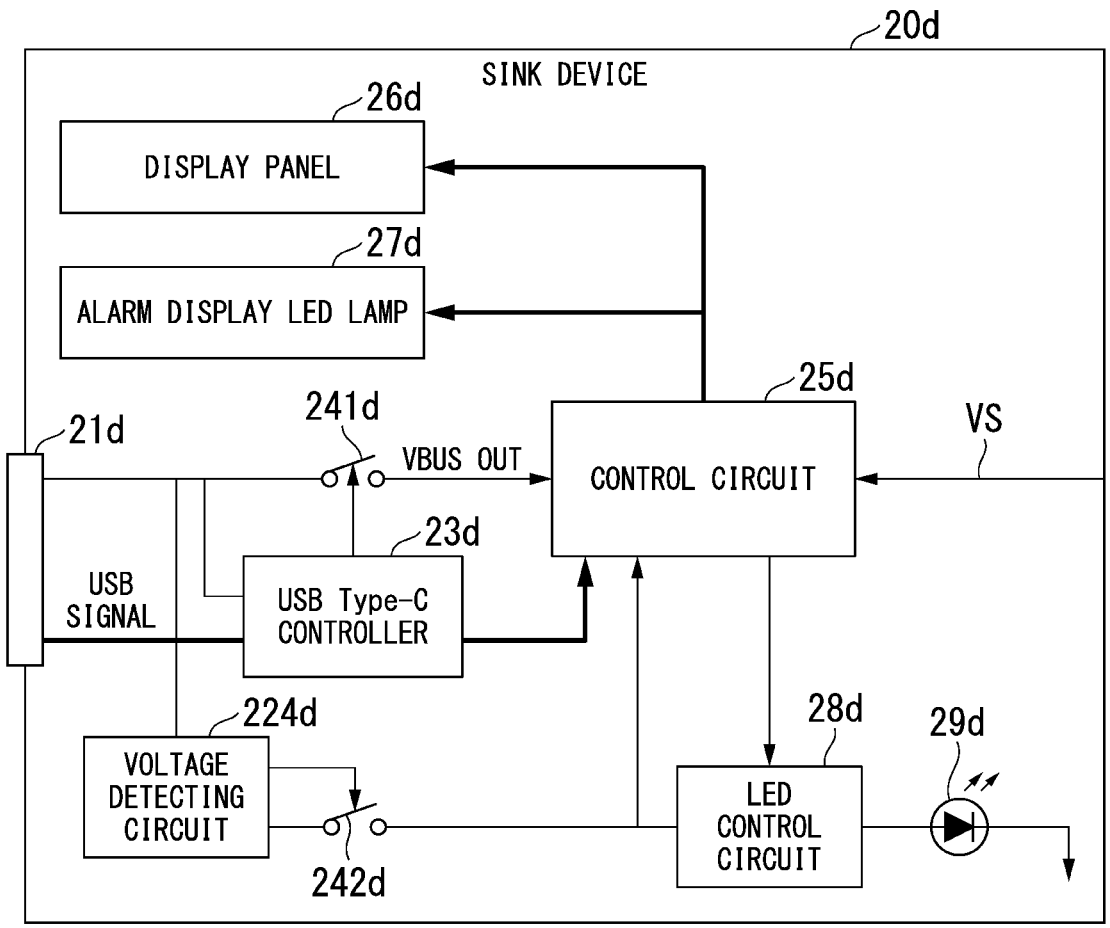
FIG. 9 is a block diagram schematically illustrating a configuration of a sink device 20d according to a fifth embodiment.

FIG. 9 is a block diagram schematically illustrating a configuration of a sink device 20d according to the fifth embodiment. The sink device 20d can notify of a decrease in voltage of VBUS and an abnormal voltage by adding an LED or the like even when the sink device 20d is not a display device such as a monitor.

The sink device 20d includes a connector 21d, a voltage detecting circuit 224d, a USB Type-C controller 23d, a switch 241d, a switch 242d, a control circuit 25d, a display panel 26d, an alarm display LED lamp 27d, an LED control circuit 28d, and an LED lamp 29d.

The connector 21d can be connected to an external device which is a source device via a USB Type-C cable.

The voltage detecting circuit 224d detects a voltage supplied to the VBUS input line connected to the connector 21d and determines whether the detected voltage is equal to or greater than a third reference voltage. The voltage detecting circuit 224d turns off the switch 242d when the detected voltage is equal to or greater than the third reference voltage, and turns on the switch 242d to supply a VBUS STANDBY signal to the control circuit 25d when the detected voltage is less than the third reference voltage. As the third reference voltage, a lower-limit voltage (standard value) at the time of supply of 20 V in the USB Type-C PD standard can be used, for example, 18.5 V can be used.

The USB Type-C controller 23d conducts negotiation when it is detected that the source device is connected to the connector 21d, turns on the switch 241d when negotiation is established and a voltage requested through the negotiation is supplied to the VBUS input line, and turns off the switch 241d when a voltage lower than the voltage requested through the negotiation is supplied to the VBUS input line.

A signal indicating the result of negotiation is output to the USB Type-C controller 23d.

The switch 241d switches between an on state and an off state on the basis of a signal from the USB Type-C controller 23d.

The switch 242d switches between an on state and an off state on the basis of the result of determination from the voltage detecting circuit 224d.

The control circuit 25d acquires a signal indicating the result of negotiation supplied from the USB Type-C controller 23d and operates by receiving a voltage supplied from the VBUS input line. When the VBUS STANDBY signal is input, the control circuit 25d transitions to a standby state and turns on or flickers the alarm display LED lamp 27d.

The control circuit 25d receives an image signal VS supplied from an external device and displays the image signal VS on the display panel 26d.

The control circuit 25d outputs a state signal indicating whether it is in a standby state or an active state to the LED control circuit 28d.

The display panel 26d is, for example, a liquid crystal panel and displays an image signal.

The alarm display LED lamp 27d includes one or more LED lamps and operates in accordance with an operation signal from the control circuit 25d.

The LED control circuit 28d turns on or off the LED lamp 29d in a mode corresponding to a state signal output from the control circuit 25d.

The LED lamp 29d is turned on or off according to an operation signal output from the LED control circuit 28d. The LED lamp 29d may be turned on in a color corresponding to the operation signal or may flicker.

With this configuration, the USB Type-C controller 23d conducts negotiation with a source device when it is detected that the source device is connected to the connector 21d. Then, the USB Type-C controller 23d turns on the switch 241d when the negotiation has been established. Accordingly, a voltage from the source device is supplied to the control circuit 25d, and the control circuit 25d operates. When its operation is started, the control circuit 25d transitions to the active state and displays the image signal VS on the display panel 26d. The control circuit 25d outputs a state signal indicating the active state to the LED control circuit 28d. Since the input state signal indicates the active state, the LED control circuit 28d turns on the LED lamp 29d in a color corresponding to the active state. Accordingly, a user can see an image signal displayed on the display panel 26d and understand that the sink device 20d is in the active state by ascertaining the turn-on state of the LED lamp 29d. In the active state, the control circuit 25d may notify that electric power is normally supplied from the source device by turning off the alarm display LED lamp 27d or turn on the alarm display LED lamp 27d in a color indicating that electric power is normally supplied.

Then, the USB Type-C controller 23d monitors whether the voltage supplied to the VBUS input line is equal to or greater than a predetermined voltage, continues to display an image signal when the voltage is equal to or greater than the predetermined voltage, and turns off the switch 241d when the voltage is less than the predetermined voltage. When the switch 241d is turned off, supply of a voltage from the VBUS input line to the control circuit 25d is stopped. When supply of electric power from the VBUS input line is stopped, the control circuit 25d stops displaying an image signal using the alarm display LED lamp 27d.

On the other hand, the voltage detecting circuit 224d detects a voltage supplied to the VBUS input line and determines whether the detected voltage is equal to or greater than the third reference voltage. The voltage detecting circuit 224d turns off the switch 242d when the detected voltage is equal to or greater than the third reference voltage, and turns on the switch 242d when the detected voltage is less than the third reference voltage. When the switch 242d is turned on, a STANDBY signal is supplied to the control circuit 25d.

Here, since supply of electric power from the VBUS input line is stopped, the control circuit 25d cannot drive the function of displaying an image signal, but can receive electric power capable of operating the alarm display LED lamp 27d or outputting a state signal to the LED control circuit 28d from the USB Type-C controller 23d. Accordingly, when the STANDVY signal is input, the control circuit 25d transitions to the standby state using the electric power acquired from the USB Type-C controller 23d. The control circuit 25d turns on the alarm display LED lamp 27d in a color indicating that an abnormality has occurred in the source device and outputs a state signal indicating the standby state to the LED control circuit 28d. Since the input state signal indicates the standby state, the LED control circuit 28d turns on the LED lamp 29d in a color corresponding to the standby state. Accordingly, even when displaying an image signal on the display panel 26d is stopped, a user can understand that the sink device 20d transitions to the standby state by ascertaining the turn-on state of the alarm display LED lamp 27d or the turn-on state of the LED lamp 29d. As a result, the user can understand that there is a likelihood that an abnormality has not occurred in the sink device 20d but an abnormality has occurred in the source device.

A sink device 50 according to a sixth embodiment will be described below.

Figure 10:
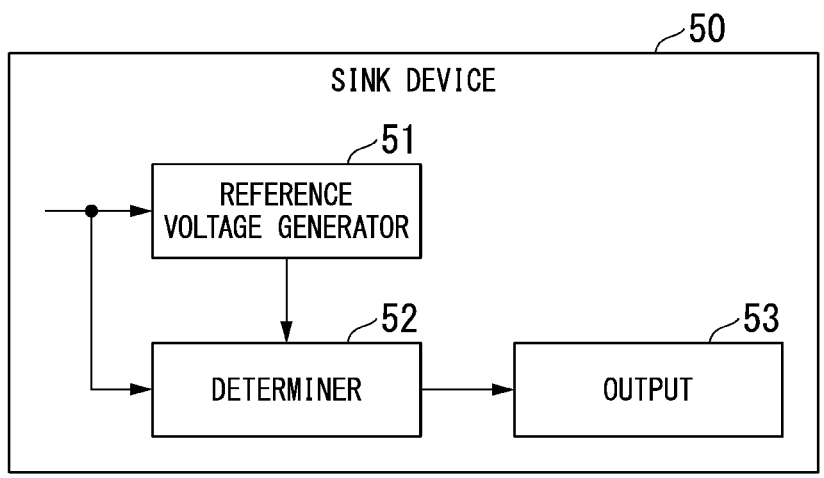
FIG. 10 is a block diagram schematically illustrating a configuration of a sink device 50 according to a sixth embodiment.

FIG. 10 is a block diagram schematically illustrating a configuration of the sink device 50 according to the sixth embodiment.

The sink device 50 is an electronic apparatus that operates using electric power supplied from a source device.

The sink device 50 includes a reference voltage generator 51, a determiner 52, and an output 53.

The reference voltage generator 51 is supplied with a first voltage from an external device and generates a reference voltage which is a voltage lower than a second voltage higher than a first voltage supplied from the external device on the basis of the second voltage when negotiation with the external device has been conducted.

The function of generating the second voltage from the first voltage may be provided in the sink device 50 or may be connected to the outside of the sink device 50.

The determiner 52 determines a magnitude relationship between the second voltage and the reference voltage.

The output 53 notifies that the voltage has decreased when the second voltage is equal to or less than the reference voltage on the basis of the result of determination.

According to this embodiment, since it is notified that the voltage has decreased, it is possible to understand that there is a likelihood that an abnormality has not occurred in the sink device 50 but an abnormality has occurred in the source device.

In the aforementioned embodiments, the sink device may not be a display device as long as it is an electronic apparatus. For example, the electronic apparatus may be a projector.

Operation management may be performed by recording a program for realizing the functions of the processing units illustrated in FIG. 1 on a computer-readable recording medium and causing a computer system to read and execute the program recorded on the recording medium. The "computer system" mentioned herein may include an operating system (OS) or hardware such as peripherals.

The "computer system" includes an home page provision environment (or display environment) as long as it uses the WWW system.

The "computer-readable recording medium" may be a portable medium such as a flexible disk, a magneto-optical disc, a ROM, or a CD-ROM or a storage unit such as a hard disk incorporated in a computer system. The "computer-readable recording medium" may include a medium that holds a program for a predetermined time such as a volatile memory in a computer system serving as a server or a client. The program may be a program for realizing some of the aforementioned functions or may be a program which can realize the aforementioned functions in combination with another program stored in advance in the computer system. The program may be stored in a predetermined server, and the program may be delivered (downloaded or the like) via a communication line in response to a request from another device.

While embodiments of the present invention have been described above in detail with reference to the drawings, the specific configuration is not limited to the embodiments, and includes designs or the like without departing from the gist of the present invention.

REFERENCE SIGNS LIST 1, 1A . . . Power supply system
10, 10a . . . Source device
11, 21, 21a, 21d . . . Connector
20, 20a, 20b, 20c, 20d, 20e . . . Sink device
22, 22a, 22b, 22c . . . Stabilizer circuit
23, 23a, 23d . . . USB Type-C controller
24, 24a . . . Switch
25d . . . Control circuit
25, 25a, 25b, 25c, 25d . . . Control circuit
26, 26b, 26c, 26d . . . Display panel
27b . . . Lamp
27d . . . Alarm display LED lamp
28d . . . LED control circuit
29d . . . LED lamp
30, 30a . . . USB Type-C cable
50 . . . Sink device
51 . . . Reference voltage generator
52 . . . Determiner
53 . . . Output
221 . . . Step-up DCDC converter
221a . . . Step-up/down DCDC converter
221b, 221c . . . DCDC converter
222 . . . First low voltage detector
222a . . . Step-down DCDC converter
222b . . . First low voltage detector
223 . . . Second low voltage detector
223c . . . Second low voltage detector
224 . . . Voltage detecting circuit
224a, 224b, 224c . . . Comparator
224d . . . Voltage detecting circuit
241d . . . Switch
242d . . . Switch

The invention claimed is:

1. An electronic apparatus comprising:
a reference voltage generator configured to
perform, with an external device, a negotiation for requesting a second voltage which is higher than a first voltage when the electronic apparatus receives the first voltage from the external device, and
generate a reference voltage which is lower than the second voltage on a basis of the second voltage;
a determiner configured to determine a magnitude relationship between the second voltage and the reference voltage; and
an output configured to notify that the second voltage is decreasing when the second voltage is equal to or lower than the reference voltage on a basis of a result of determination.

2. The electronic apparatus according to claim 1, wherein the reference voltage generator comprises:
a first reference voltage generator configured to generate a first reference voltage lower than a voltage determined through the negotiation; and
a second reference voltage generator configured to generate a second reference voltage lower than the first reference voltage, wherein the determiner comprises:
a first determiner configured to determine a magnitude relationship between the second voltage and the first reference voltage; and
a second determiner configured to determine a magnitude relationship between the second voltage and the second reference voltage, and
wherein the output comprises:
a first output configured to output a result indicating that the second voltage is equal to or lower than the first reference voltage on a basis of a result of determination from the first determiner; and
a second output configured to output a result indicating that the second voltage is equal to or lower than the second reference voltage on a basis of a result of determination from the first determiner.

3. The electronic apparatus according to claim 2, wherein the second output is configured to output a message indicating that a residual capacity of a battery provided in the external device decreases.

4. The electronic apparatus according to claim 2, the electronic apparatus further comprising:
a power supply managing unit configured to cut off supply of electric power to a monitor provided in the electronic apparatus on a basis of an output of the second output.

5. The electronic apparatus according to claim 1, wherein the reference voltage generator comprises:
a first DCDC converter configured to generate a reference voltage by stepping down the second voltage supplied from the external device.

6. The electronic apparatus according to claim 1, the electronic apparatus further comprising:
a second DCDC converter configured to generate a third voltage which is requested from the external device through the negotiation from a voltage supplied from the external device,
wherein the reference voltage generator generates the reference voltage from the voltage output from second DCDC converter.

7. The electronic apparatus according to claim 1, wherein the output employs one of a lamp and a display panel.

8. A display device comprising:
a reference voltage generator configured to
perform, with an external device, a negotiation for requesting a second voltage which is higher than a first voltage when the electronic apparatus receives the first voltage from the external device, and
generate a reference voltage which is lower than the second voltage on a basis of the second voltage;
a determiner configured to determine a magnitude relationship between the second voltage and the reference voltage; and
an output configured to notify that the second voltage is decreasing when the second voltage is equal to or lower than the reference voltage on a basis of a result of determination.

9. A voltage management method comprising:
performing, with an external device, a negotiation for requesting a second voltage which is higher than a first voltage when the electronic apparatus receives the first voltage from the external device;
generating a reference voltage which is lower than the second voltage on a basis of the second voltage;
determining a magnitude relationship between the second voltage and the reference voltage; and notifying that the second voltage is decreasing when the second voltage is equal to or lower than the reference voltage on a basis of a result of determination.

\* \* \* \* \*